T. C. Merrill,
Reciprocating Saw-Mill.
No 5,666.                               Patented July 11, 1848.
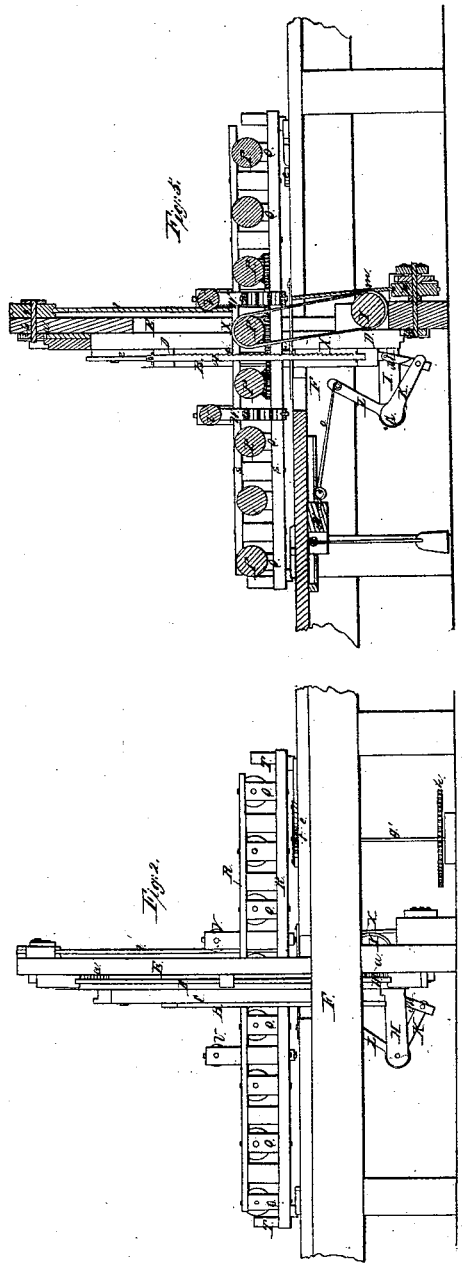
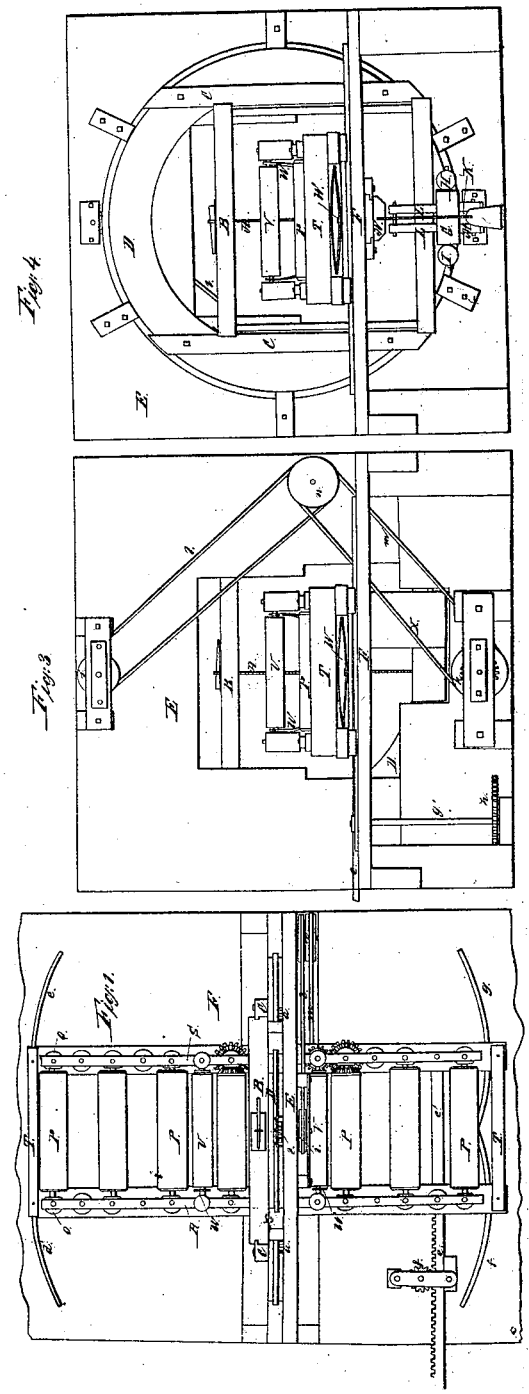

UNITED STATES PATENT OFFICE.

THOMAS C. MERRILL, OF NEWBURY, MASSACHUSETTS.

MACHINERY FOR SAWING IRREGULAR SHAPES.

Specification of Letters Patent No. 5,666, dated July 11, 1848.

*To all whom it may concern:*

Be it known that I, THOMAS C. MERRILL, of Newbury, in the county of Essex and State of Massachusetts, have invented a new and useful Improvement in Machinery for Sawing Timber into Irregular Shapes; and I do hereby declare that the same is fully described and represented in the following specification and accompanying drawings, letters, figures, and references thereof.

Of said drawings Figure 1 represents a top view of my sawing machine. Fig. 2 is a side elevation. Fig. 3 is a front end elevation. Fig. 4 is a rear end elevation, and Fig. 5 is a central, vertical, and longitudinal section of it.

In said figures A exhibits the saw which is fixed in a frame B, which is made to slide up and down, or to have a reciprocating movement between two guides or rails C, C, screwed upon one face of a circular flat ring D. Said ring is supported in position by and upon a vertical frame or plate E elevated upon the main table or frame E, and extending both above and below the upper surface thereof. The ring D should be so applied to the plate E as to be capable of being revolved around its center—for the purpose of causing the saw to take such a lateral inclination to a horizontal plane as it may be desirable at any time to give to it.

The saw frame is alternately raised and depressed by machinery as follows: G is a short horizontal rocking shaft sustained in position by two arms or struts, H, I, which project from the face of the circular ring D, and support the shaft in a manner to allow of its being partially rotated in opposite directions. From said shaft two arms K, L, project at, or about at right angles to one another. One of said arms is connected with the saw frame by a connecting link M, jointed to it and the saw frame. The other arm is connected to a horizontal sliding carriage N (so applied to the underside of the table F, as to be capable of being moved in a longitudinal direction backward and forth) by a rod O which is jointed both to the arm and carriage and to the latter by a swivel and universal joint. When the carriage is moved to and fro, a reciprocating movement is by the intervening machinery imparted to the saw frame. The circular ring D may have one or more series of cogs *a*, *a*, &c., projecting from its periphery, which may be made to engage with one or two toothed pinions *b*, *b*, either of which may be turned around by hand or any power properly applied to it, and in such manner as to regulate or vary the transverse inclination of the saw, as circumstances may require.

The next part of my invention is the mechanism by which the board or article to be sawed is held in position and moved either in one direction or the other horizontally and transversely. For this purpose I make use of a movable frame or system of parallel supporting and feed rollers, which are made, arranged and applied in the following manner: P, P, P, &c., exhibit a series of rollers whose journals are respectively supported and revolve in bearings or cylinders Q, Q, &c., which are arranged within two parallel and vertical frames, R, S. Each of said bearings or cylinders, should be so sustained in its frame R or S, as to be capable of a horizontal rotation on its axis. Each of the frames R, S, is made to turn horizontally on the top of the table—and for this purpose it is supported on a fulcrum or turning pivot, placed in the plane of the saw frame, one of which is seen at *c*, in Fig. 5. Both extremities of each frame are sustained by curved rails or ways *d*, *e*, *f*, *g*, as seen in Fig. 1. The two frames are connected together by transverse bars T, T, which are so jointed to the said frames, as to admit of the frames being simultaneously moved horizontally on their turning pivots or fulcrum, the object of the said transverse bars T, T, being to always maintain the parallelism of the frames in whatever position they may be. V, V, are pressure rollers for holding the board, to be sawed down upon the supporting rollers. They are to be applied to the frames R, S, in a manner similar to the other rollers but with this exception that they are to each have one or more springs W applied to it in such manner, as to draw it down upon the board, and permit it to rise or fall as occasion may require.

In order to cause the board, to be sawed, to move forward upon the sustaining rollers, one of the said rollers, that is, one which is next to the saw, has an endless band or chain X passing around it, and a broad cogged pinion or drum Y, situated below the system of rollers; as seen in the drawings, the rollers on each side of the said central roller, should be so connected with the same, by gear wheels, as to be moved by and with it in the same directions in order to move the board forward in one direction. A rotary movement is to be given to the drum Y, by an endless band proceeding from the driving power; and when so actuated the said drum will impart the necessary motions to the feeding rollers.

The lateral motions of the feeding frame are produced, by a rack $e'$ (which is jointed to the frame at one end) resting upon the top of the table, and being made to engage with a toothed pinion $f'$ fixed on the top of a shaft $g'$ which may be rotated by a crank fixed on its top, or by power applied to a cogged wheel $h$, fixed on said shift, or in any other convenient manner. The two gears or pinions $b$, $b$, may have pulleys $i$, $k$, on their axles, around which endless belts $l$, $m$, may pass and thence to and around the circumference of a double grooved pulley $n$. If a crank is put on the axle of said pulley $n$, the operative who conducts the motions of the machine, can lay hold of said crank with one hand while at the same time with the other he seizes the crank of the pinion $f'$. Then by turning said cranks, he may at the same time change the inclination of the saw, and impart such a lateral movement to the series of feed rollers, and board thereon, as to cause the saw to travel in any irregular path required.

What I claim as my invention is—

1. The combination of the circular revolving ring or frame D, with the reciprocating movable saw frame; as arranged and operated together substantially in manner and for the purpose as specified.

2. I also claim the horizontal movable frame or system of parallel feed rollers (made to operate as above described) in combination with the reciprocating movable saw frame.

3. And for the purpose of effecting the sawing of any material at variable inclinations to the horizon and in irregular lines across it during the up and down movements of the saw, I claim the combination with the reciprocating saw, of the circular revolving frame or ring D, and the horizontal movable frame or system of parallel rollers, as arranged and made to operate as above specified.

4. I also claim the combination of vertical parallel frames R S, and turning bearings Q, Q, with the rollers or cylinders P, P, &c., the whole being arranged and made to operate together and with respect to the saw substantially as specified.

In testimony whereof I have hereto set my signature this twenty ninth day of July, A. D. 1847.

THOMAS C. MERRILL.

Witnesses:
ISRAEL R. CHESLEY,
LUTHER C. MERRILL.